United States Patent [19]
Istomin

[11] Patent Number: 5,450,823
[45] Date of Patent: Sep. 19, 1995

[54] AXIAL-PISTON MACHINE

[75] Inventor: Sergei S. Istomin, Moscow, Russian Federation

[73] Assignee: Tsentralny Nauchno-Issledovatelsky Avotmobilny I Avotmotorny Institut, Moscow, Russian Federation

[21] Appl. No.: 78,163
[22] PCT Filed: Dec. 17, 1990
[86] PCT No.: PCT/SU90/00277
   § 371 Date: Oct. 18, 1993
   § 102(e) Date: Oct. 18, 1993
[87] PCT Pub. No.: WO92/11450
   PCT Pub. Date: Sep. 7, 1992
[51] Int. Cl.$^6$ .............................. F02B 75/24
[52] U.S. Cl. .................. 123/56.3; 123/56.4
[58] Field of Search ............. 123/58 B, 58 BA, 56.3, 123/56.4

[56]  References Cited

U.S. PATENT DOCUMENTS

| 1,346,672 | 7/1920 | Patton . | |
|---|---|---|---|
| 2,424,660 | 7/1947 | Howard | 74/60 |
| 3,180,159 | 4/1965 | Girodin . | |

FOREIGN PATENT DOCUMENTS

| 2277233 | 7/1974 | France . | |
|---|---|---|---|
| 862385 | 1/1953 | Germany | 123/56.4 |
| 2723135 | 11/1978 | Germany | 123/56.3 |
| 23823 | 9/1910 | United Kingdom | 123/56.3 |

*Primary Examiner*—Noah P. Kamen
*Attorney, Agent, or Firm*—Ladas & Parry

[57]  ABSTRACT

The body of the proposed axial piston machine incorporates a cylinder block with cylindrical spaces. The axes of the cylindrical spaces are parallel with the longitudinal axis of the engine crankshaft and the cylindrical spaces accommodate reciprocating pistons. Each piston is connected to one end a rod. The other end of the rod is articulated with the swash plate, which is mounted via a first support, on the inclined journal of the shaft installed on supports in the body and which is articulated to the body by universal joints. The machine of the invention provides a second spherical support for the swash plate. The second support is connected with the frame and the center of the support is essentially aligned with the geometric center of the connecting member of the universal joints. The bisector plane which is the plane of symmetry of the universal joints passes through the center of the support.

6 Claims, 10 Drawing Sheets

AXIAL-PISTON MACHINE

FIELD OF THE INVENTION

The present invention relates to piston machines and, more specifically, to an axial-piston machine.

BACKGROUND OF THE INVENTION

At the present time the automotive industry is one of the most rapidly developing branches of industry, so that engineers are constantly turning to non-traditional engine design in particular to piston engines with axially-arranged cylinders. The advantages of axial arrangement of cylinders in I.C. piston engines, resulting in their smaller weight and dimensions, are widely known. As compared with traditional piston engines incorporating a crank gear for converting the reciprocating motion of pistons into rotary motion of the crankshaft the size and weight of automotive axial-piston engines are reduced 1.5–2 times, and the aerodynamic resistance of the motor vehicle can be reduced due the smaller space occupied by the engine under the engine hood.

Modern requirements for reduction of the amount of cancerogenic substances exhausted by I.C. engines of transport facilities together with the exhaust gases and for diminishing the consumption of unreplenishable supplies of fuel force machine builders to turn to axial-piston engines with a variable cylinder volume.

Where such engines are used in vehicles under conditions of city traffic the fuel consumption is reduced by 30–40% with a proportional reduction of the amount of concerogenic substances in the total engine exhaust.

Thus, the axial-cylinder engine is the latest advancement in the development of I.C. piston engines.

However, up to the present time attempts to design a reliable efficient axial-piston engine have failed due to alternating fatigue stresses originating in the parts of the mechanism which converts the reciprocating motion of cylinder pistons into rotary motion of the shaft.

Attempts to solve the problem of ensuring reliable performance of the axial-piston engine resulted in the appearance of an axial-piston machine (FR Application [R/] 3420529 A₁). The body of the known machine accommodates a cylinder block with cylindrical spaces whose axes are parallel with the longitudinal axis of the shaft. Pistons reciprocate in those spaces, each piston articulated to one end of a rod whose other end is articulated to a swash plate. The articulated joint of the other end of the rod to the swash plate is formed by means of a first cylindrical pin passing through the lugs of the yoke constituted by the other end of the rod and through an intermediate member, and a second cylindrical pin whose axis is perpendicular to the axis of the first pin, passing through the intermediate member and the lugs in the swash plate. The swash plate is installed, via a support, on the inclined crank of the shaft which latter is located on supports in the engine body. The swash plate is connected by a universal joint with the body. The support of the swash plate on the inclined crank of the shaft is spherical which provides for swinging of the plate while the reciprocating motion of the pistons in converted into rotary motion of the shaft.

The universal joint yoke is located in the cylinder block with a provision for longitudinal motion, viz., along the longitudinal axis of the shaft. The movement of the yoke entails the movement of the spherical support over the inclined shaft journal and a reduction of the swash plate angle which brings about a reduction of the swept volume of engine cylinders.

The use of one universal joint fails to ensure uniform precession of the swash plate due to changes in its angular velocity which take place twice per crank-shaft revolution in a plane perpendicular to the longitudinal axis of the swash plate. This produces a strong moment of inertia of the mass of the swash plate and parts associated therewith, said moment resulting in rapid fatigue failure of the universal joint.

The use of the universal joint as one of the swash plate supports still further reduces its reliability due to the heavy alternating loads imposed by the swash plate on the joint.

The provision of one spherical support of the swash plate results in this case in that the reaction forces originating on the swash plate and transmitted from it to the body via the shaft and universal joint are destructive to the shaft due to strong bending moments applied to it and destructive to the universal joint due to alternating dynamic loads.

The universal joint in the known design of the axial-piston engine is rather large because it performs the function of one of the swash plate supports and this hinders the development of the spherical surface of the support resting on the inclined journal of the shaft. This support takes the strongest forces arising in the engine while converting the reciprocating motion of the pistons into rotary motion of the shaft and, in view of the limited dimensions of the spherical surface of the support, its serviceability is low due its limited durability.

Next, the inclination angle of the longitudinal axis of the swash plate to the longitudinal axis of the crankshaft is 40°. This causes large amplitude angular oscillations of the swash plate relative to its axis, which produces heavy inertial loads resulting in engine failure.

It follows from the above that the known machine is one of the attempts to create an axial piston engine, and is unsuccessful because of the above-cited disadvantages.

An attempt to eliminate the angular oscillations of the swash plate relative to its longitudinal axis was materialized in an axial-piston machine taught by U.S. patent, A, U.S. Pat. No. 2,424,660. The body of this machine houses a cylinder block with spaces whose axes are parallel to the longitudinal axis of the shaft and which accommodate reciprocating pistons. Each piston is articulated with one end of a rod whose other end is articulated with the swash plate. The latter is installed via a support on the inclined journal of a shaft mounted on supports in the frame. The swash plate is connected by two universal joints with the body. The swash plate support is an angular ball bearing whose inner race is connected rigidly with the inclined shaft journal while the outer race is secured on the swash plate. This shows that there is only one support which carries all loads impossed by the swash plate. Such a single-support fastening of the swash plate on the inclined shaft journal keeps the swash plate from moving along the inclined journal and from changing its angle of inclination. Thus, it is not possible to develop a machine with a variable swept volume of its cylinders.

In spite of the fact that the above-mentioned function of the machine is not attained, the connection of the swash plate with the frame via two universal joints substantially improves the performance of the machine, since there are no angular oscillations of the swash plate along its longitudinal axis which, in turn, precludes the destructive inertial loads caused by such oscillations.

Each universal joint consists of a ring with four pins which are arranged in one plane and have mutually perpendicular axes. Two coaxial pins of one universal joint are articulated with the swash plate, while the other two pins of this joint are articulated with the intermediate member in the form of a ring. The latter is articulated with the coaxial pins of the other universal joint.

The mutually—perpendicular pins are articulated with the lugs of a hollow part secured in the engine body. Inasmuch as the known design has no fixed position of the bisector plane passing through the point of intersection of the longitudinal axes of .the shaft and the swash plate and dividing in half the angle formed by the planes, each of which passes through the mutually—perpendicular axes of the universal joint pins, the service life of the universal joints is reduced considerably because of the additional unbalanced loads arising therein.

SUMMARY OF THE INVENTION

At the basis of the invention is the object of providing an axial-piston machine wherein the design of the swash plate and the fixing of the position of the bisector plane of two universal joints relative to the center of oscillations of the swash plate would improve its serviceability, extend operating life and broaden its operating capabilities.

The object is achieved in an axial-piston machine whose body accommodates a cylinder block with cylindrical spaces whose axes are parallel with the longitudinal axis of a shaft and which contain reciprocating pistons, each articulated with one end of a rod whose other end is articulated with a swash plate installed via a first support on the inclined crank of the shaft located on the body supports and articulated by universal joints with the body, in that according to the invention, a second support of the swash plate is provided, interacting with the plate, connected with the body and having a spherical shape with its center serving in fact as a center relative to which the angular motion of each universal joint occurs and through which center a bisector plane passes which is the plane of symmetry of the universal joints and on which the center of the connecting member of the universal joints lies.

Such a design of the axial-piston machine improves its reliability and serviceability due to the distribution of the load imposed on the swash plate between its supports, the first of which transmits the active moment from the swash plate to the shaft, while the second one transmits the reaction torque to the machine body.

Next, the alignment of the geometrical center of the second support with the center around which the two universal joints move angularly and through which the bisector plane of the two universal joints passes substantially reduces the dynamic load originating in the ball joint of the swash plate with the second support.

It should be noted that there is no mutual axial movement of links in the universal joints which fact eliminates axial loads on the machine body and promotes reliability and performance of the machine.

In machines of a comparatively low power due to a comparatively light load imposed on the crankshaft, it is good practice to locate the second support of the swash plate in the zone between two planes, each passing through two axes of a corresponding universal joint.

In this case both universal joints encompass the second support. Such location of the second support makes it commensurate in size with the first support which carries the bulk of the load of the swash plate. The carrying of the reactive load of the swash plate by the second support makes the plate more reliable which in the long run ensures high reliability and performance of the machine as a whole.

It is necessary that the axis of the inclined shaft journal should form an acute angle with the longitudinal axis of the swash plate, the range of the angle varying from 10° to 32° with changes in the swept volume of the cylinders.

Such a design ensures a degree of change of swept volume up to three times, these changes being quite smooth. Then, at such a degree of swept volume change, each cylinder can work either at a constant compression ratio or in accordance with compression ratio changes.

If the angle between the axis of the inclined shaft journal and the axis of the swash plate is smaller than 10°, it is not possible to maintain a constant compression ratio and moreover, to vary it within the limits in which it is greater at the minimum swept volume of the cylinders.

If this angle is larger than 32°, the bearing areas of the spherical surface of the first support will be sharply reduced and the crankshaft will be subjected to considerable axial loads.

For machines with a high torque transmitted by the crankshaft, it is recommended that the second support should embrace both universal joints.

The distance between the cylinder axes in these machines is increased which results in an increase of the swash plate diameter and, consequently, has made it possible in turn to substantially increase the size of the second swash plate support. An increase in the size of the second support results in reduction of the specific pressures in it by increasing its surfaces of interaction. Arrangement of two universal joints inside the second support reduces the diameter of the connecting member and the radius of the universal joints so that the latter may be made lighter in weight. This reduces the dynamic load occurring due to irregular movement of the connecting member, thereby enhancing the reliability and seviceability of the machine.

It is recommended that the second support be installed with the possibility for it to be moved along the shaft axis and that the first support of the swash plate be provided with a spherical outer surface, interacting with the congruent spherical surface of the swash plate, and with an inner celindrical surface which interacts with the cylindrical surface of the inclined shaft journal.

Such a design of the machine ensures a change in the cylinder volume to suit the load characteristic of the machine. This is due to the fact that the movement of the second support along the shafts axis caused movement of the first support over the inclined shaft journal which results in angular turning of the swash plate relative to the geometrical center of the second support due to interaction between the spherical surfaces of the second support and the swash plate. The spherical shape of the second support and the outer spherical surface of the first support ensure that only comparatively small forces are required to move the second support. A variation in the cylinder volume of the machine broadens its service capabilities.

All the above considerations confirm the simplicity of the design of the mechanism for changing the swept volume of the machine cylinders and the possibility of developing axial piston engines with the swept volume of the cylinders varying in operation, having light weight and small size while ensuring efficient conversion of the energy produced by combustion of the air-fuel mixture into mechanical energy taken off the engine shaft.

BRIEF DESCRIPTION OF THE DRAWINGS

Other objects and advantages of the invention will be elucidated by the following examples of its realization on with reference to the accompanying drawings in which.

DETAILED DESCRIPTION OF THE PREFERRED EMBODIMENTS

An axial-piston machine realized in accordance with the present invention and embodied in a 5-cylinder I.C. engine comprises a body 1 (FIG. 1) incorporating a cylinder block 2 and a crankcase 3, interconnected by fastening elements (not shown). An oil pan 4 is attached to the cylinder block 2 and the crankcase 3. A cover 5 is secured by bolts 6 to the cylinder block 2. Oil leaks are prevented by a gasket 7 installed between the cylinder block 2 and the crankcase 3, a gasket 8 between the cylinder block 2 and the oil pan 4, and a gasket 9 between the cylinder block 2 and the cover 5. The cylinder block has cylindrical spaces. 10. The axis $O_2$—$O_2$ of the cylindrical spaces 10 are in parallel with the longitudinal axis $O_1$—$O_1$ of an engine crankshaft 11. Pistons 12 are accommodated in the cylindrical spaces 10 with the possibility for reciprocating motion.

Figure 1:
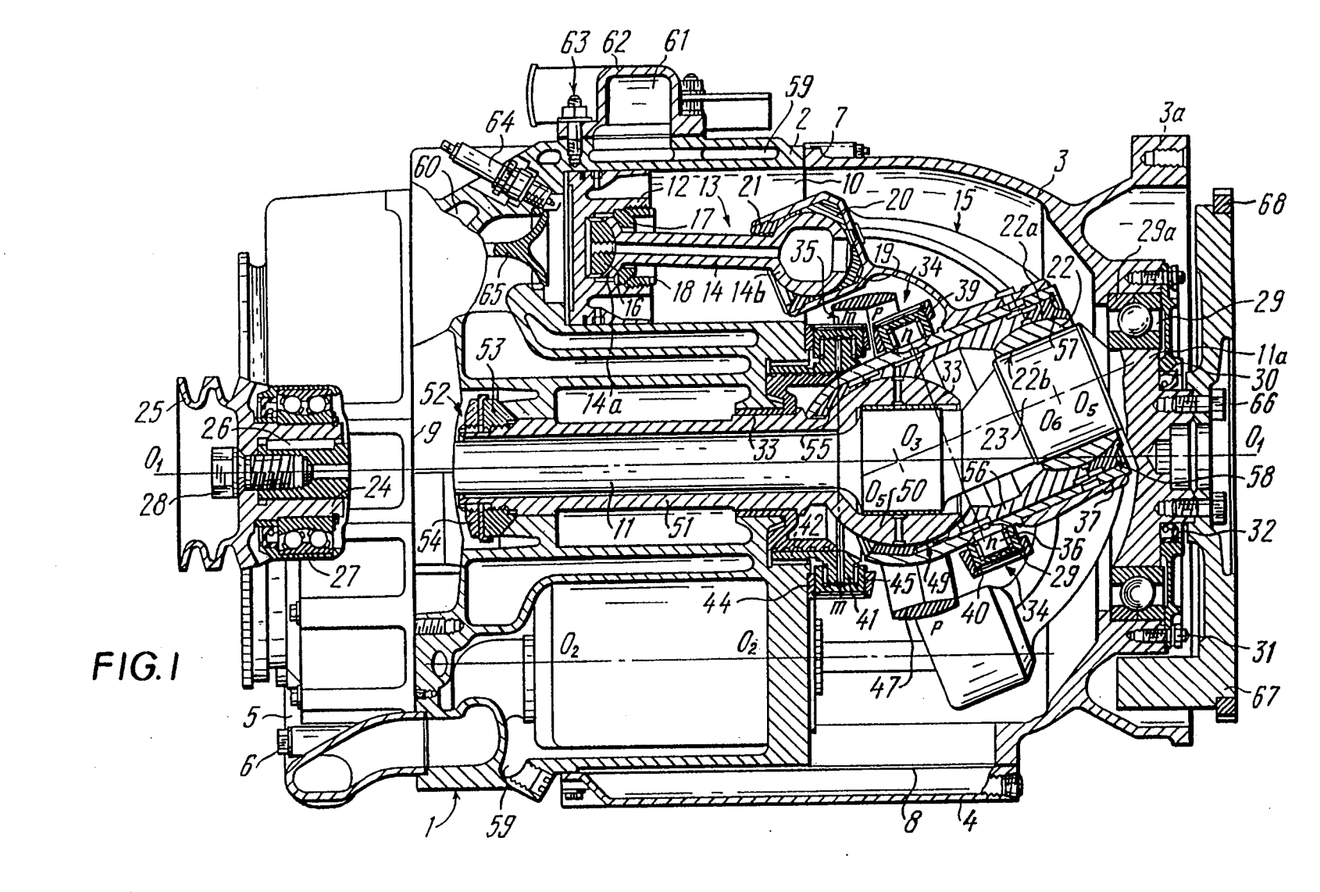
FIG. 1 is a schematic longitudinal section of the axial-piston engine according to the invention.
Figure 2:
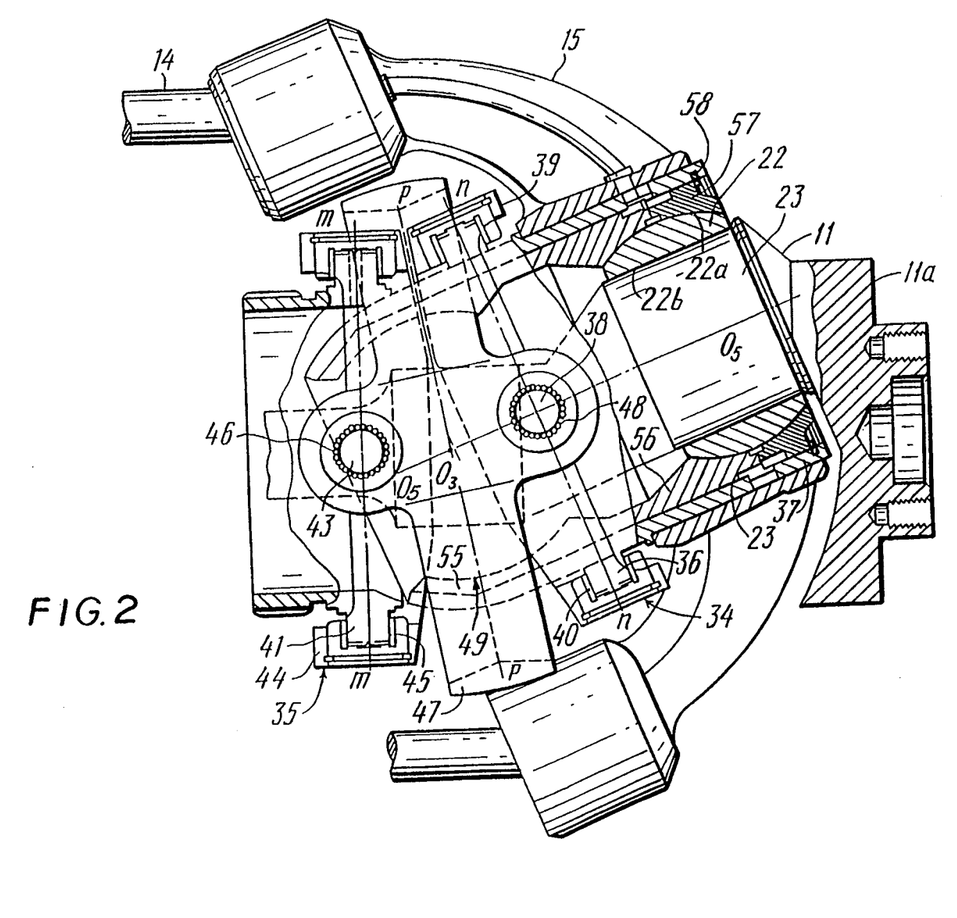
FIG. 2 is a universal joint unit, enlarged.

Each piston 12 is connected by a kinematic linkage 13 with one end 14a of a rod 14 whose other end 14b is articulated with a swash plate 15. The kinematic linkage 13 is made up of a liner 16 with a spherical surface interacting with the spherical surface 14a of the rod 14. To hold the rod 14, the piston 12 is provided with a liner 17 whose axial motion relative to the piston 12 is limited by a threaded bushing 18 screwed into the piston 12. The articulated joint between the end 14b of the rod 14 and the swash plate 15 has the form of a ball head accommodated in a cylindrical socket 19 of the swash plate 15, the number of the sockets 19 being equal to the number of engine cylinders. A liner 20 With a spherical surface which interacts with the surface of the ball head of the rod 14, a threaded bushing 21 holding the rod 14 are located in each socket 19. The swash plate 15 is mounted on an inclined journal 23 of the shaft 11 via the first support 22. One end of the crankshaft 11 is connected to a hub 24 of a pulley 25 by a key 26. The hub 24 is installed in a two-row angular rolling-contect bearing 27 accommodated in the cover 5 and intended to prevent axial displacement of the crankshaft 11. The hub 24 is secured on the latter with a bolt 28. The other end of the crankshaft 11 is installed in a rolling contact bearing 29 accommodated in the flange 3a of the crankcase 3. The outer race 29a of the bearing 29 is secured in the flange 3a by a cover 30 connected to the flange 3a by a screw joint 31. A cup 32 in the cover 30 prevents oil leaks from the crankcase 3. Sagging of the crankshaft 11 is reduced by the provision of an intermediate silding-contact support 33. To prevent the swash plate 15 from turning relative to its axis, a kinematic connection of it to the frame 1 by means of universal joints 34 and 35 is provided. The universal joint 34 is formed by pins 36 made integral with a hub 37 rigidly connected to the swash plate 15 by pins 38 (FIG. 2) located on a ring 39 mounted via needle bearings 40 on pins 36 (FIG. 1). The axes of pins 36 and 38 (FIG. 2) are mutually perpendicular in one plane. The universal joint 35 is formed by pins 41 made integral with a bushing 42 connected by splines with the frame 1. (FIG. 1) and by pins 43 (FIG. 2) made on a ring 44 which is installed on the pins 41 via needle bearings 45. The axes of pins 41 and 43 are mutually perpendicular in one plane. The pins 43 are connected by needle bearings 46 with a connecting member 47 in the form of a ring in which needle bearings 48 are mounted on pins 38. The axes of pins 36 and 41 lie in a single plane while the axes of pins 38 and 43 lie in a mutually perpendicular plane. The swash plate 15 (FIG. 1) has a second support 49 of a spherical shape. The support 49 of the swash plate 15 is located between two planes: plane n—n passing through the axes of pins 36 and 38 (FIG. 2), i.e. through the axial plane of the joint 34, and plane m—m passing through the axes of pins 41 and 43, i.e. through the axial plane of the joint 35.

The support 49 (FIG. 1) has a ball head 50 and a cylindrical body 51 installed in the cylinder block 2 of the frame 1. The cylindrical body 51 of the support 49 at the side opposite to the ball head 50 is connected to the cylinder block 2 of the body 1 by a screw joint 52 formed by a nut 53 screwed on the threaded end of the cylindrical body 51. To prevent change in the position of the second support 49 relative to the cylinder block 2 of the frame 1, the tapered surface of the nut 53 is pressed against a corresponding surface on the cylinder block 2. The nut 53 is kept from working loose by a locknut 54. A first liner 55 and a second liner 56 are located between the hub 37 and the ball head 50, each having a spherical surface interacting with ball head 50. The center O₃ of the ball head 50 of the support 49 coincides with the center of the radius of curvature of the spherical surfaces of first and second liners 55, 56, and is, essentially, aligned with the geometric center of the connecting member 47. The bisector plane p—p which is the plane of symmetry of the universal joints 34 and 35 passes through the center of the connecting member 47, i.e. through the center O₃. The first support 22 is a bushing with a spherical external surface 22a and an internal cylindrical surface 22b encompassing the cylindrical surface 23a of the journal 23 of the crankshaft 11. A third liner 57 located between the hub 37 and the support 22 has an internal spherical surface interacting with the spherical surface 22a of the support 22 which interacts with the spherical surface of the second liner 56. The first, second and third liners 55, 56 and 57 are kept from falling out of the hub 37 by a lockring 58.

Location of supports 22 and 49 inside the hub 37 makes them commensurate with loading. Inasmuch as the first support 22 takes the bulk of the load of the swash plate 15, i.e. the reactive and active loads, while the second support 49—only a part of the reactive load, this enhances the reliability of the engine. The channels delivering lubricant to the above-specified articulated joints are not shown in FIG. 1 so that the drawings will not be encumbeved width excessive numbers that would hamper a clear understanding of the proposed technical solution.

A cooling space 59 made in the cylinder block 2 communicates with a space 60 in the head of the cylinder block 2 and with a space 61 of a cooling branch pipe 62 secured on the cylinder block 2 with fastening elements 63. The cylinder block 2 with fastening elements 63. The cylinder head incorporates spark plugs 64, one for each cylinder, and a reciprocating inlet valve 65 and exhaust valve (not shown in the figure).

A flywheel 67 with a ring gear 68 intended for meshing with the engine starting device (not shown in the drawing) is secured with bolts 66 to the shaft 11 in the zone of the flange 3a.

The axial piston machine functions in the engine mode as follows.

The toothed member of the starting device (not shown in FIG. 1) comes in engagement with ring gear 68 of the flywheel 67 and rotates it. The flywheel 67 rotates the shaft 11. As the inclined journal 23 of the shaft 11 starts rotating, its motion is transmitted via the support 22 to the swash plate 15. Acting via the pins 36 and needle bearings 40, the hub 37 of the moving swash plate 15 causes angular motion of the ring 39 of the universal joint 34 around the axes of the pins 36. The movement of the ring transmitted by the pins 38 (FIG. 2) and needle bearings 48 cause the ring shaped connecting member 4 to swing. The movement of the connecting member 47 acting via the pins 43 and needle bearings 46 causes angular motion of the ring 44 around the axes of the pins 41 (FIG. 1) due to a splined joint of the bushing 42 with the body 1. Due to the symmetry of the universal joints 34 and 35 the ring 39 turns around the axes of pins 36 through an angle equal to that of the ring 44 turning around the axes of the pins 41. The turning of the pins 36 and the hub 37 due to rotation of the inclined journal 23 of the shaft 11 makes the swash plate 15 move. In the course of this motion the spherical surface of the liner 20 interacts with the spherical surface of the end 14b of the rod 14 and pulls the latter to the right (in the drawing). The other end 14a of the rod 14 interacts through its spherical surface with the spherical surface of the liner 17 The spherical surface interacts with the spherical surface of the threaded bushing 18 which transmits the force to the piston 12. The fuel-air mixture enters through the open inlet valve 65 into the space 10 of that cylinder wherein the piston 12 moves to the right (as seen in the drawing).

When the shaft 11 has turned through 180° the swash plate 15 starts moving, towards the head of the cylinder block 2 of the body 1 in the plane passing through the axes of the cylindrical space of the machine. During its movement the other spherical surface of the liner 20 interacts with the other spherical surface of the end 14b of the rod 14 and pushes the latter to the left (as shown in the drawing). The spherical surface of the other end 14a of the rod 14 interacts with the spherical surface of the liner 16. The liner 16 transmits the force to the piston 12. The exhaust valve 65 is closed. Under the effect of the force transmitted by the liner 16 to the piston 12, the latter moves in this cylinder to the left (as shown in the drawing) and compresses the fuel-air mixture. In the TDC zone the fuel-air mixture is ignited by the spark plug 64. The volume of burning gases increases during combustion of the fuel-air mixture, thus increasing the pressure of gases acting, in particular, on the surface of the piston 12 facing the spark plug 64. The force built up by the pressure of hot gases moves the piston 12 to the right (as shown in the drawing). The progressive motion of the piston 12 causes a complex motion of the swash plate 15 which converts it into rotary motion of the shaft 11. The complex motion of the swash plate 15 is ensured by the turning of the ring 44 relative to the axes of the pins 41, by the swinging of the connecting member 47 and the turning of the ring 39 relative to the axes of the pins 36. This complex motion of the swash plate 15 causes a reactive moment. The torque component of the reactive moment lying in the plane perpendicular to the axis of the shaft 11 is transmitted from the body 1 via the splined joint of the body 1 with the bushing 42, via pins 41 of the bushing 42, the ring 44, pins 43 of the ring 44, the connecting member 47, pins 38 of the ring 39 and pins 36 to the swash plate 15.

The other component of the reactive moment, lying in a plane passing through the axis of the shaft 11 and being, essentially, a bending moment, is transmitted from the body 1 to the swash plate 15 via the tapered surface of the nut 53 and the cylindrical surface of the sliding support 33, the ball head 50, first liner 55 and second liner 56 and the hub 37.

The spherical shape of the second support 49 of the swash plate 15, the support being connected to the body 1, and the coincidence of its center O₃ with the geometrical center of the connecting member 47 through which the bisector plane p—p passes i.e. the plane of symmetry of the universal joints 34 and 35, improve the reliability and serviceability of the machine, since said coincidence of centers separates the reactive moment into the components, i.e. the torque transmitted to the body 1 through universal joints 34 and 36, and the being %moment transmitted through the ball support 49.

Then the piston 12 moves to the left (as shown in the drawing) and the exhaust gases are discharged through the open exhaust valve (not shown in the drawing). The working cycle described above is repeated after completion of the exhaust stroke.

In a five-cylinder axial-piston engine realized according to the invention, with a sum cylinder volume of 2.7 l and a maximum torque of 220 Nm on the crankshaft, the load on the first support is approximately 4.0 t. and about 4.0 t on the second support. This axial-piston engine was run on the stand for 300 h without breakdowns.

In order to reduce the fuel consumption a version of the axial-piston engine is proposed in accordance with the invention incorporating a technical solution which broadens its operational capabilities.

In this proposed version of the engine, the change in its load curve is accompanied by a change in the swept volume of the cylinders. For this the second support 49 is provided, with a means 69 (FIG. 3) for moving it along the axis $O_1$—$O_1$ of the shaft 11a. The axis $O_4$—$O_4$ of the inclined journal 23a of the shaft 11a forms an acute angle, e.g. 12°, with the longitudinal axis $O_5$—$O_5$ of the swash plate 15 at the maximum volume of the cylinders, and 28° at the minimum volume of the cylinders. The provision of this angle between the axes $O_4$—$O_4$ and $O_5$—$O_5$ ensures a change in the angle of inclination of the longitudinal axis $O_5$—$O_5$ of the swash plate 15 to the longitudinal axis $O_1$—$O_1$ of the shaft 11a and maintains the compression ratio either constant within the preset limits or varying in accordance with a preset function, e.g. from $\epsilon = 10$ at a minimum cylinder volume to $\epsilon = 9$ at a maximum cylinder volume.

Figure 3:
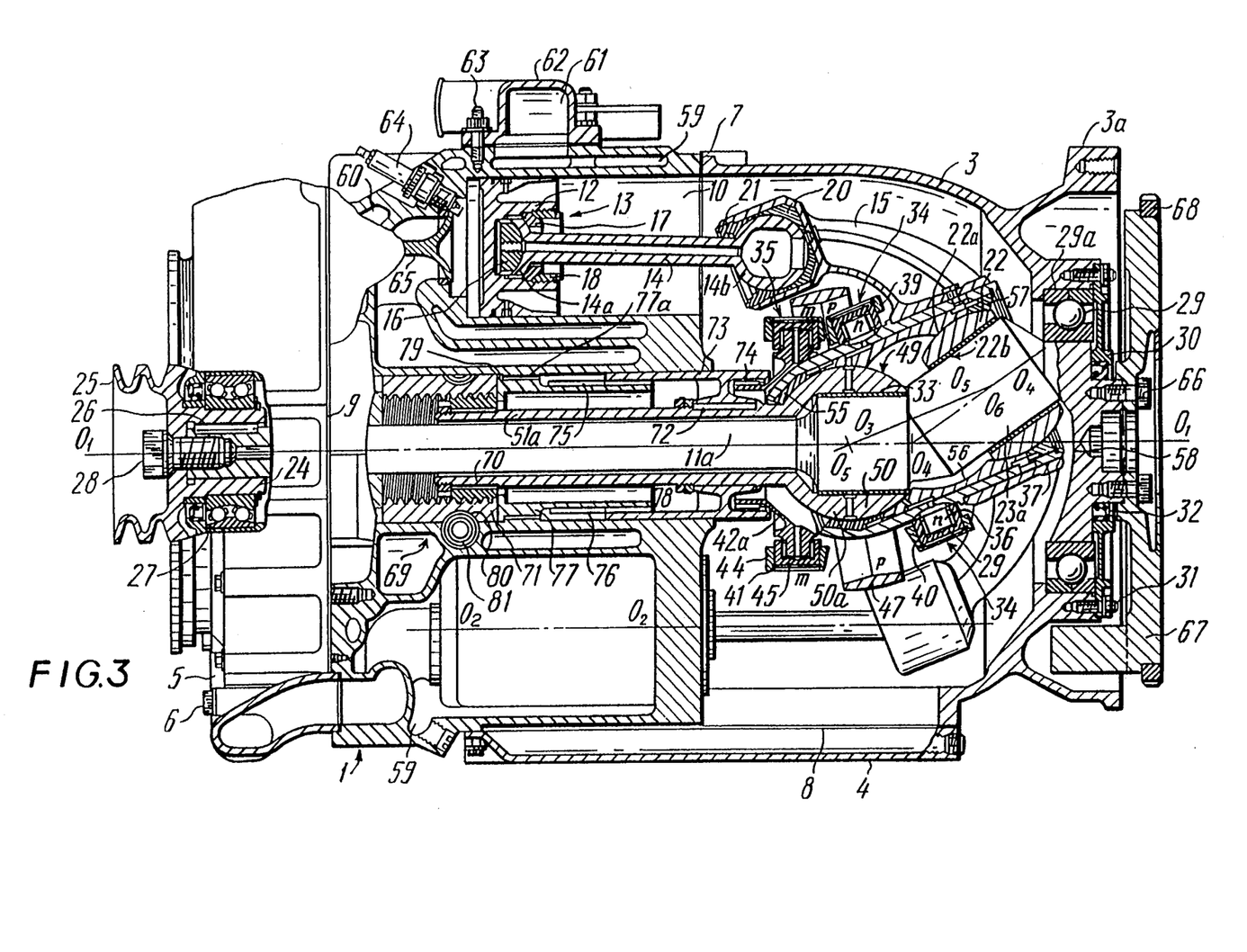
FIG. 3 is a longitudinal section of the axial-piston engine with a variable swept volume of cylinders according to the invention; .

The cylindrical body 51a at the side opposite the ball head 50a is connected by a spline joint to a threaded bushing 70. A nut 71 screwed on the threaded end of the cylindrical body 51a is provided to prevent axial displacement of the threaded bushing 70 along the cylindrical body 51a. The cylindrical body 51a in the zone of the head 50a has a key 72 fitted into the keyway of a cylindrical bushing 73. The bushing 73 has splines 74 for connection to the bushing 42a and splines 75 which engage with splines 76 of a bushing 77. The cylindrical bushing 73 is installed in the cylinder block 2 of the body 1 and is kept from shifting along the cylindrical body 51a by nuts 78. The bushing 77 is installed in the cylinder block 2 of the body 1, embraces the cylindrical body 51a, is connected by a splined joint to the body 1 and has a circular shoulder 79 intended to limit the longitudinal displacement of the bushing 77 relative to the cylinder block 2 of the body 1. The means 69 for moving the second support 49 is made up of a worm wheel 80 and a worm 81 installed in the cylinder block 2 of the body 1 and engaged with each other. The internal surface of the wheel 80 has a thread 82 engaging the thread of the bushing 70.

As the load on the axial-piston engine changes, for example, when the transport vehicle is slowed down, the rotation of the worm 81 puts the worm wheel 80 in rotation. The turning of the worm wheel 80 moves the threaded bushing 70 to the left towards the head of the cylinder block 2. Movement of the threaded bushing 70 displaces the cylindrical body 51a of the second support 49, i.e. the second support 49 proper. The spherical surface of the moving second support 49 interacts with the spherical surface of the liner 55 which, in turn, interacts with the hub 37 of the swash plate 15. The latter moves and so does its first support along the inclined journal 23a of the shaft 11a towards its axis $O_1$—$O_1$ which reduces the angle between the axis $O_5$—$O_5$ of the swash plate 15 and the axis $O_1$—$O_1$ of the shaft 11a. The movement of the swash plate causes the pistons 12 to move toward the head of the cylinder block 2 of the body 1 so that the distance from the face surface of each piston 12 to the head of the cylinder block 2 of the frame 1 is reduced, thus reducing the stroke of pistons 12, and the swept volume of the cylinders of the axial-piston engine.

A shorter stroke of the pistons 12 reduces mechanical losses and losses on suction of the fuel- air mixture and exhaust of the burnt gases from the cylinder, which enhances engine efficiency.

A certain increase in the compression ratio caused by reduction of the distance from the end face of each piston 12 to the head of the cylinder block 2 improves combustion of the fuel-air mixture which raises engine efficiency.

As the transport vehicle powered by the disclosed axial-piston engine gains speed, the worm 81 rotating in the opposite direction causes the warm wheel 80 to rotate. Rotation of the worm wheel 80 moves the bushing 70 away from the head of the cylinder block 2 until the end of the bushing 70 abuts on the end face of the bushing 77. In the course of movement of the bushing 70, the cylindrical body 51a of the support 49 moves to the right (as shown in the drawing) and the surface of its ball head 50a interacts with the spherical surface of the liner 56. The second spherical surface of the liner 56 interacts with the spherical surface 22a of the support 22 which, interacting via its cylindrical surface 22b with the cylindrical surface of the inclined journal 23 of the shaft 11a, transmits the force to the hub 37 via the liner 57 and lockring 58. This force moves the swash plate 15 away from the cylinder block 2 which reduces the angle between the axis $O_5$—$O_5$ of the swash plate 15 and the axis $O_1$—$O_1$ of the shaft 11a. Movement of the swash plate 15 is accompanied by movement of the pistons 12 away from the head of the cylinder block 2 of the body 1, i.e. the distance from the end face of each piston 12 to the head of the cylinder block 2 of the body 1 the stroke of the pistons 12 and the swept volume of the cylinders of the axial-piston engine increaseing. While the swash plate 15 is moving, it turns relative to the center of the spherical surface $O_6$ of the first support 22 which is accompanied by the turning of the swash plate 15 relative to the geometerical center $O_3$ of the second support 49. Due to the spherical shape of the second support 49 and the external spherical surface 22a of the first support 22, the forces required for moving the second support 49 are small. The use of the worm pair 80, 81 as one of the elements of the means 69 for moving the second support 49 ensures a self-braking effect which allows the swash plate 15 to be fixed in any one of its intermediate positions.

In another embodiment of the I.C. engine, a change in its load curve accompanied by a change in the cylinder volume is ensured by a means 83 (FIG. 4) for moving the second support 49 along the axis of the shaft 11a. This means 83 is a piston 84 installed in the cylinder block 2 of the body 1, secured by a nut 85 on the end of the cylindrical body 51b facing the head of the cylinder block 2 and provided with sealing rings 86. The cylindrical bushing 73 is made in a similar way while the bushing 77a has sealing rings 87 and a circular space 88 communicating through a line 89 with the source of a liquid delivered under pressure (not shown in the drawing).

Figure 4:
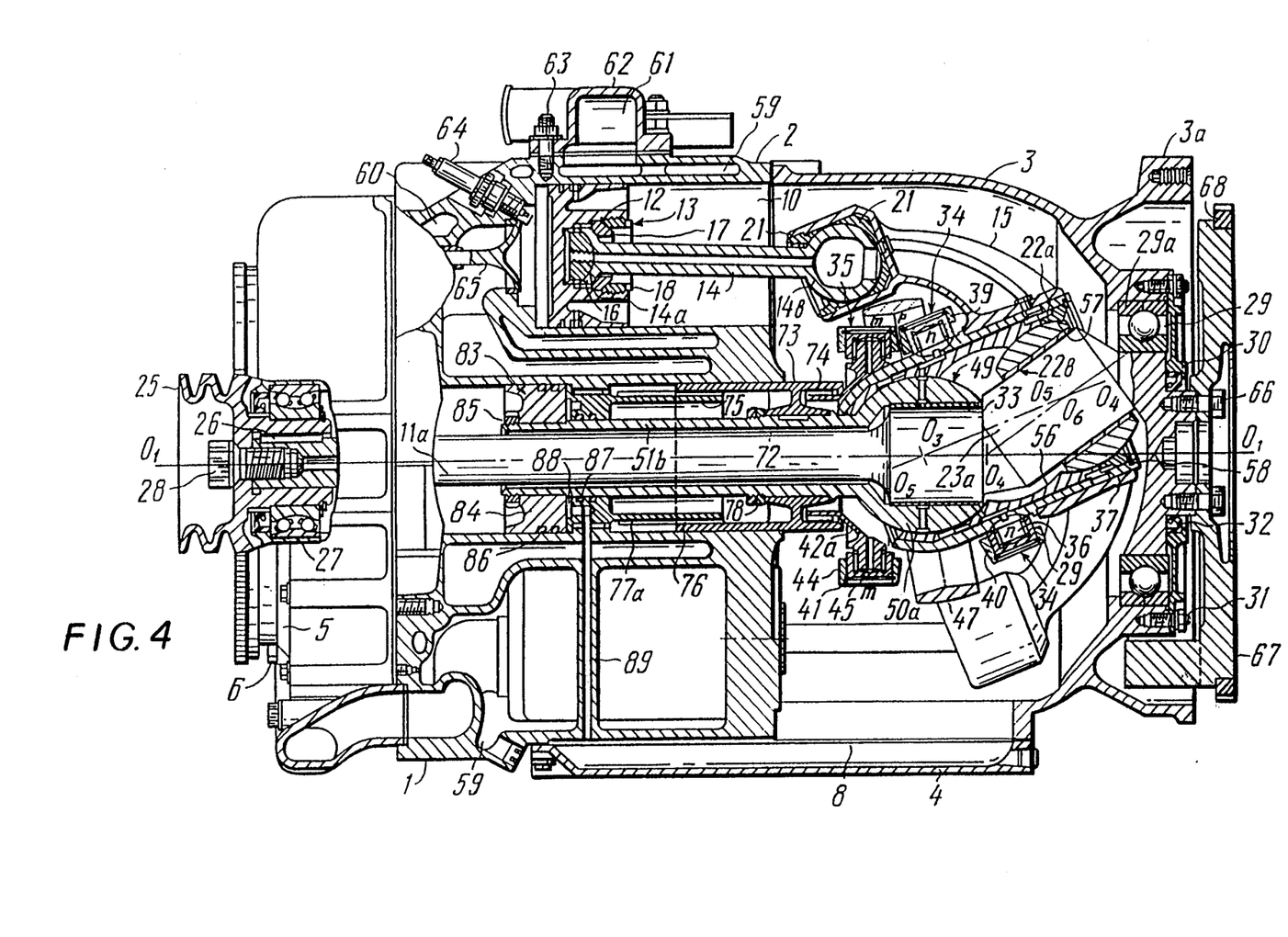
FIG. 4 is a longitudinal section through the axial-piston engine with a variable swept volume of cylinders and a hydraulic drive for moving the swash plate according to the invention.

When the load on the axial-piston engine changes, for instance, when the transport vehicle is slowed down, the liquid is delivered under pressure through the line 89 into the space 88. The force developed by the liquid pressure moves the piston 84 grid the second support 49 connected therewith towards the head of the cylinder block 2. A change in the position of the swash plate 15 and a corresponding change in the volume of the cylinders take place in a manner similar to that described above.

As the transport vehicle is accelerated, the space 88 communicates with the discharge line. The force developes by the pressure of the hot gases acting on the end face of each piston 12 moves the corresponding piston 12 which acts on the swash plate 15 via the above-described kinematic linkage. The position of its second support 49 is changed in a manner similar to the process described above and causes the piston 84 to move away from the head of the cylinder block 2.

Irrespective of the design of the mechanism for moving the second support 49, the operating capabilities of the axial-piston machine are broadened. With relation to an axial-piston machine of 2.7 l volume, the fuel consumption under city traffic conditions is reduced by 30–35%. The use of liquid under pressure to move the second support 49 creates the possibility for adjustment of the cylinder volume without participation of the driver.

Figure 5:
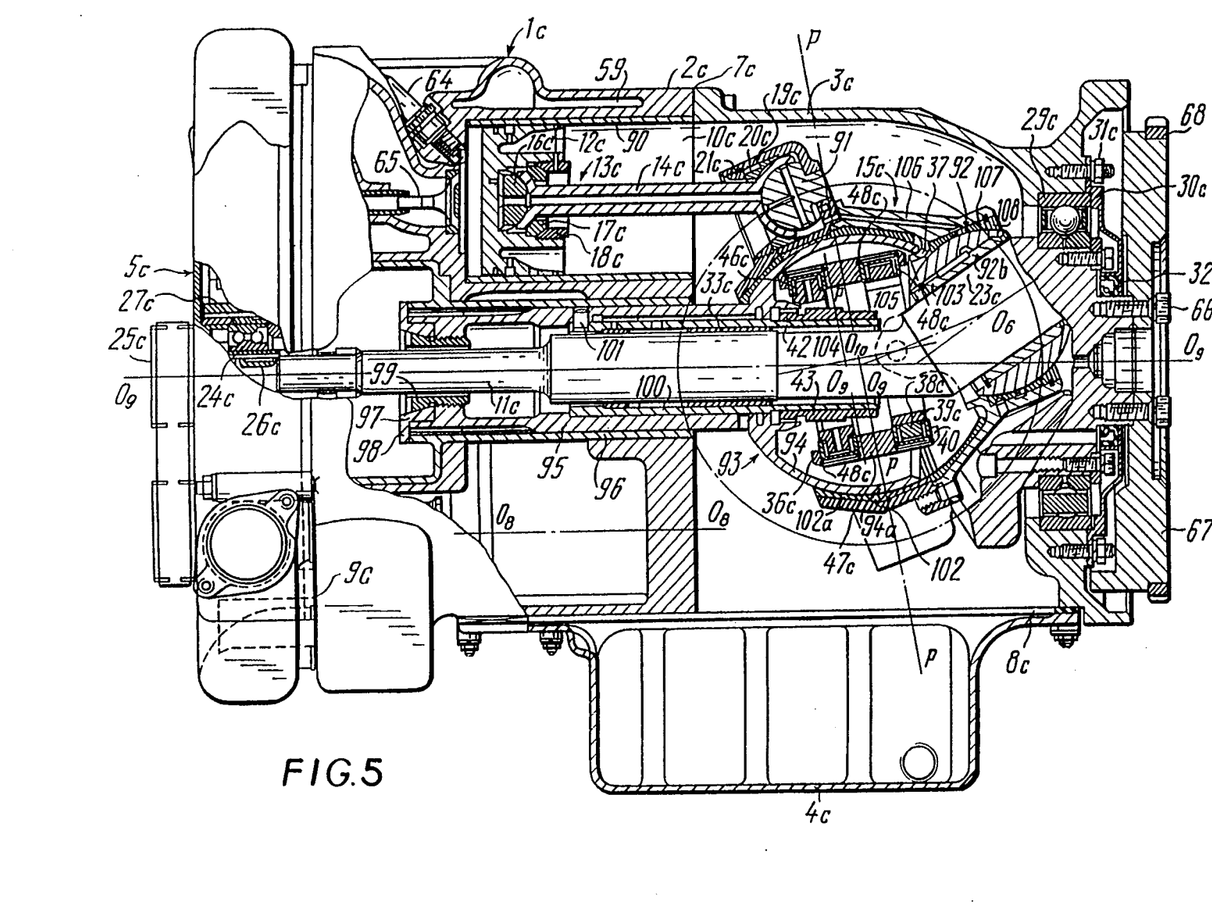
FIG. 5 is an embodiment of the axial-piston engine according to the invention, in longitudinal section.
Figure 6:
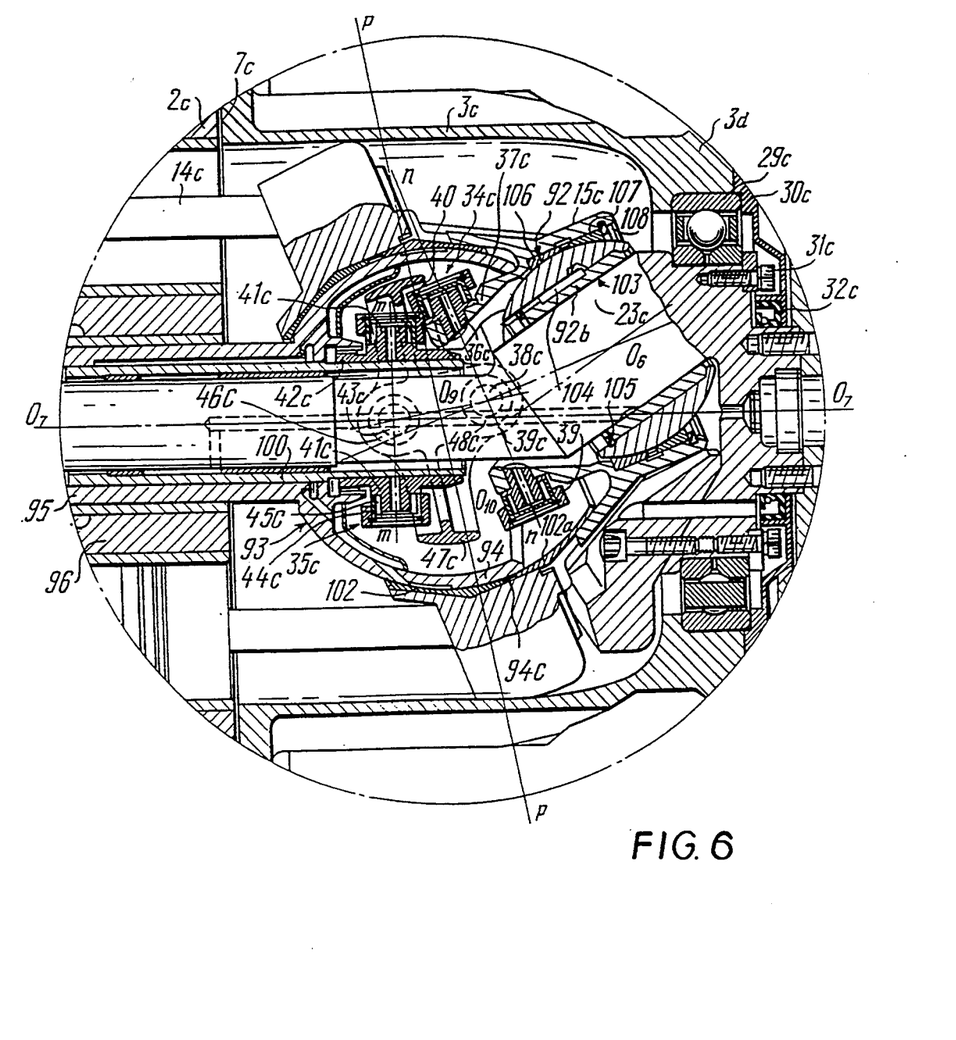
FIG. 6 illustrates the first and second supports of the swash plate and the universal joints turned through 90° in a plane perpendicular to the longitudinal axis of the shaft according to the invention, in an enlarged, longitudinal section.

The axial-piston machine realized in accordance with the invention and embodied in a 7-cylinder I.C. engine comprises a body 1c (FIG. 5) incorporating a cylinder block 2c and a crankcase 3c held together by fastening elements (not shown in the drawing). An oil pan 4c is secured to the cylinder block 2c and crankcase 3c. A cylinder head 5c is secured to the cylinder block 2c with bolts 6c. Gaskets are provided to prevent oil leaks including a gasket 7c between the cylinder block 2c and crankcase 3c, a gasket 8c between the cylinder block 2c and the oil pan 4c, and a gasket 9c between the cylinder block 2 and the head 5c. The cylinder block 2c has cylindrical spaces 10c whose axes $O_8$—$O_8$ are parallel to the longitudinal axis $O_7$—$O_7$ of the engine crankshaft 11c. The pistons 12c reciprocate in the cylindrical spaces 10c provided with cylinder sleeves 90. Each piston 12c is connected by articulated linkage 13c with one end of a rod 14c whose other end is articulated to the swash plate 15. The articulated linkage 13c is formed by a liner 16c with a spherical surface of the rod 14c. A liner 17c is provided to hold the rod 14c in the piston 12c, the axial movement of the liner relative to the piston 12c being limited by a threaded bushing 18c connected with the piston 12c by a screw joint. Also, the articulated linkage 13c incorporates an articulated joint between the other end of the rod 14c and the swash plate 15c in the form of a support with spherical surfaces, the support being located in a cylindrical socket 19c made in the swash plate 15c, the total number of such sockets 19 being seven. Each socket 19c accommodates a ball-type thrust bearing 91. The spherical surface of the ball-type thrust bearing 91 is mated with the corresponding spherical surface of the support of the other end of the rod 14c. Each socket 19c accommodates a liner 20 with a spherical surface interacting with the spherical surface of the support of the other end of the rod 14c, and a threaded bushing 21c holding the rod 14c in the swash plate 15c. The swash plate 15c is installed via the first support 92 on the inclined journal 23c of the shaft 11c. One end of the crankshaft 11c is connected to the hub 24c of the pulley 25c by the key 26c. The hub 24c is installed in the two-row angular rolling-contact bearing 27c located in the head 5c and preventing the axial displacement of the shaft 11c. To prevent axial displacement, the hub 24c is secured on said shaft 11c by a bolt (not shown in the drawing). The other end of the shaft 11c is installed in the rolling-contact bearing 29c located in the flange of the crankcase 3c. The outer race of the bearing 29c is secured in the flange of the crankcase 3c by a cover 30c connected by a screw joint 31c to the flange of the crankcase 3c. A cup 32c in the cover 30c prevents oil leaks from the crankcase 3c. Sagging of the shaft 11c is reduced by an intermediate sliding support 33c. Turning of the swash plate 15c about its axial is prevented by its kinematic linkage to the body 1c, said linkage being constituted by universal joints 34c and 35c (FIG. 6).

The universal joint 34c consists of pins 36c secured in the hub 37c of the swash plate 15c and of pins 38c made on the ring 39c which is installed with the aid of needle bearings 40c on pins 36c. The axes of the pins 36c and 38c are mutually perpendicular in a single plane. The universal joint 35c is formed by pins 41c made integral with the bushing 42c, and by pins 43c located on the ring 44c which is installed with the aid of needle bearings 45c on the pins 41c. The axes of pins 41c and 43c are mutually perpendicular in a single plane. The pins 43c are connected by needle bearings 46c to the connecting member 47c in the form of a ring accommodating needle bearings 48c located on the pins 38c. The axes of pins 36c and 41c lie in the same plane while the axes of pins 38c and 43c lie in a plane mutually perpendicular. Thereto the swash plate 15 has a second support 93 of a spherical shape. The support 93 has a hollow ball head 94 and a cylindrical body 95 accommodated in a holder 96 connected with the cylinder block 2c of the body 1c. The cylindrical body 95 of the support 93 at the side opposite the hollow ball head 94 is connected to the holder 96 by means of a bushing 97 (FIG. 5) with a flange 98 and a threaded bushing 99 connected by a screw joint with the threaded end of the cylindrical body 95. To prevent axial displacement of the bushing 97 and holder 96, the bushing 97 is secured on the holder 36 with the aid of fasteners (not shown in the figure). In order to prevent changes in the position of the second support 93 relative to the cylinder block 2c of the body 1c, the tapered surface of the threaded bushing 99 is pressed against a corresponding surface on the bushing 97. The cylindrical body 95 is connected by a spline joint to the holder 96 and installed on a bushing 100 which embraces the support 33c of the shaft 11c and is arranged concentrically with the body 95. The mutual axial displacement of the bushing 100 and cylindrical body 95 is prevented by a pin 101. Liners 102 with a spherical surface 102a interacting with the outer spherical surface 94a of the hollow ball head 94 are installed between the hub 37c and the hollow ball head 94. The center $O_9$ of the outer spherical surface of the hollow ball head 94 of the second support 93 coincides with the center of the radius of curvature of the spherical surface of liners 102 and essentially coincides with the geometrical center $O_{10}$ of the connecting member 47c. The bisector surface p—p passing through the center of the connecting member 47c, i.e. through the center $O_{10}$, is the plane of symmetry of the universal joints 34c and 35c. The first support 92 is, essentially, a bushing with an outer spherical surface 92a and an inner cylindrical surface 92b which embraces the cylindrical surface of the journal 23c of the shaft 11c. A bushing 103 is located between the journal 23c of the shaft 11c and the inner cylindrical surface 92b. The support 92 is provided with a key 104 and a lock ring 105. Liners 106 and 107 located between the hub 37c and the support 92 have spherical surfaces interacting with the spherical surface 92a of the support 92. The liners 106 and 107 are kept from falling out of the hub 37c by a lock ring 108.

The seven-cylinder axial-piston I.C. engine functions in a manner similar to that described above. This engine develops a high torque which imposes a heavy load on its second support 93. The bending moment caused by this load and taken by the external spherical surface 94a of the head 94 of the second support 93 is transmitted to the cylinder block 2c of the body 1 via the holder 96. The force of the swash plate 15c is transmitted to the inclined journal 23c of the shaft 11 via the bushing 103.

Due to the comparatively large meridianal size of the hollow ball head 94, the universal joints 34c and 35c are accommodated in its space, which diminishes the diametrical dimension of the connecting member 47c and their radial dimensions and, consequently, their mass. Reduction of the dynamic load caused by uneven motion of the connecting member 47c has enhanced the reliability and serviceability of the axial-piston I.C. engine.

A means 109 (FIG. 7) for moving the second support 93 is provided to change: the load curve of the seven-cylinder I.C. engine. This means 109 is similar to that described above. The difference is that the external surface of the flange 98a of the bushing 97c has a thread 110 meshing with the threaded portion 82c of the worm wheel 80c meshing with the worm 81c.

Figure 7:
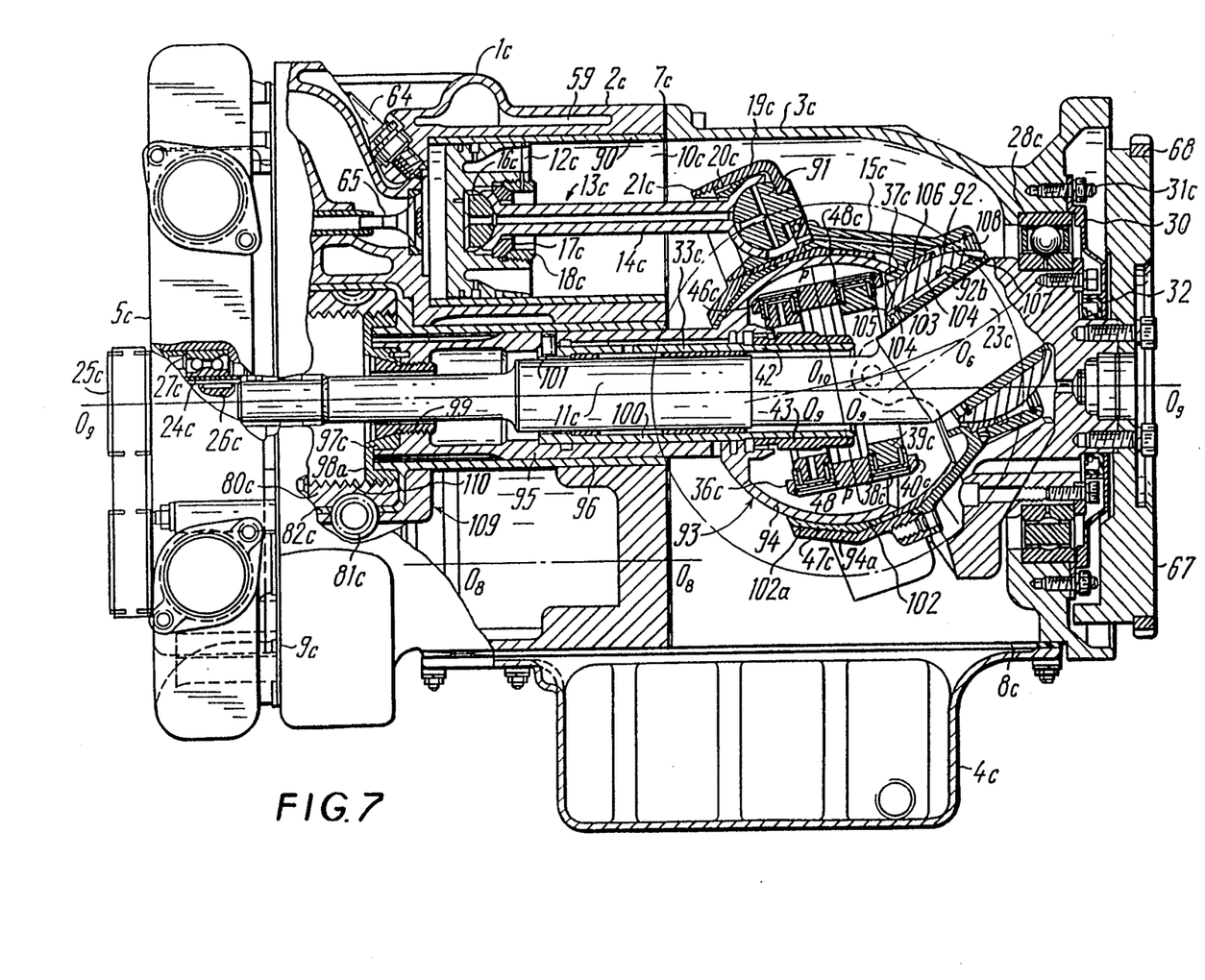
FIG. 7 illustrates an embodiment of the axial-piston engine with a variable swept volume of cylinders according to the invention, in longitudinal section.

The seven-cylinder axial-piston engine operates in modes similar to the modes described above. Rotating, the worm 81c transmits rotation to the worm wheel 80c which causes displacement at the bushing 97c. This displacement of the bushing 97c causes displacement of the threaded bushing 99 and the cylindrical body 95. The movement of the cylindrical body 95 causes movement of the hollow ball head 94 of the second support 93. Its external spherical surface 92a interacting with the spherical surface of the corresponding liner 102 causes the swash plate 15c to move. Movement of the swash plate 15c causes the bushing 103 of the first support 92 to move along the axis of the inclined journal 23c of the shaft 11c, and the spherical surface of the liner 107 interacts with the spherical surface 92a of the second support 93. Changes in the position of the longitudinal axis of the swash plate 15c and of the axes of universal joints 34c and 35c relative to the longitudinal axis of the shaft 11c, and the resultant changes in the position of the longitudinal axis of the swash plate 15c relative to the axis of the inclined journal 23c of the shaft 11 take place as described above.

In another embodiment of the I.C. engine a means 111 (FIG. 8) is provided for moving the second support 93. The means 111 is realized in a manner similar to that described above. The difference is that the flange 98b of the bushing 97c functions as a piston. The surface of the piston facing the holder 96 and its end face define a space 112 connected by a hydraulic line 113 to a source of liquid under pressure (not shown in the drawings).

Figure 8:
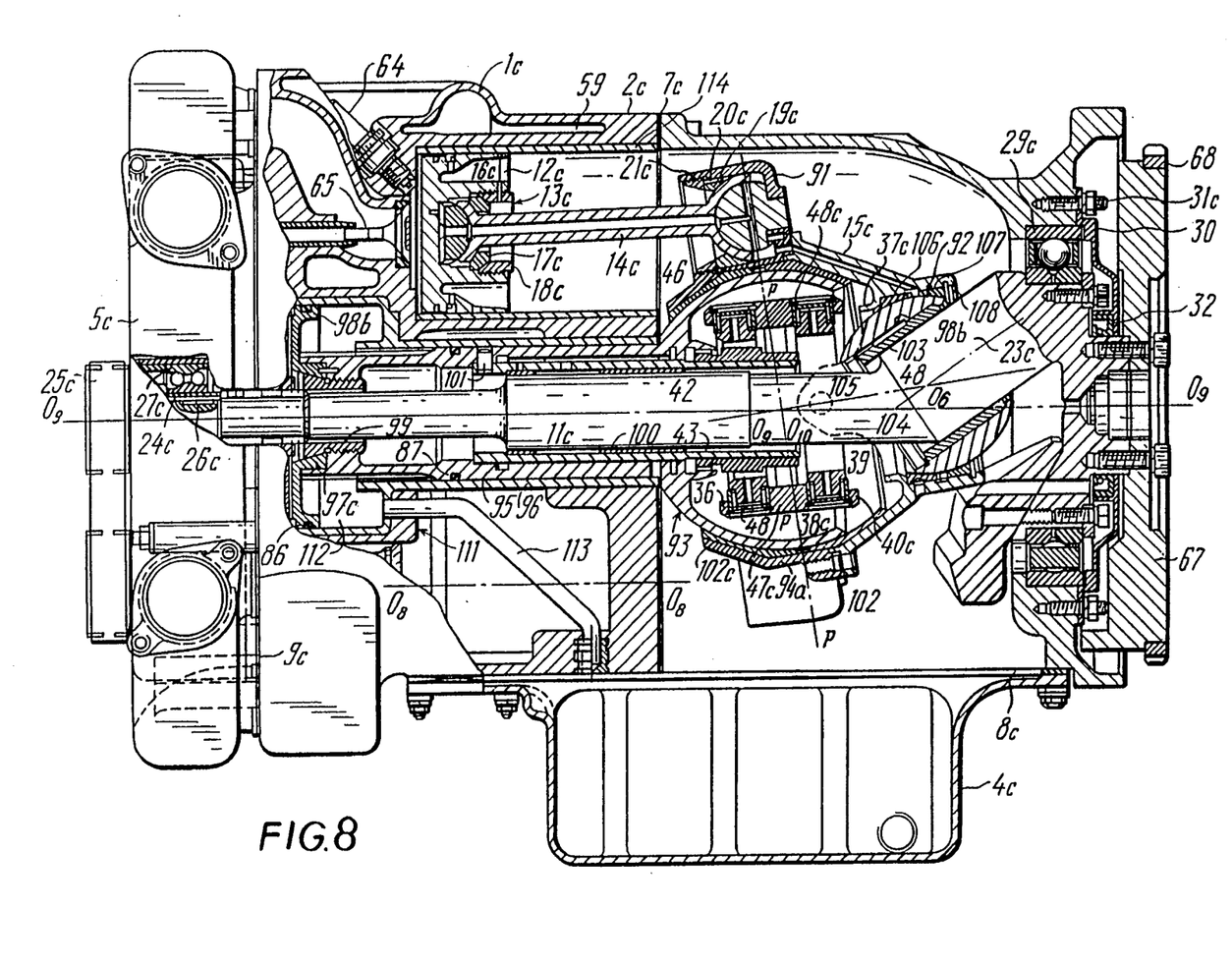
FIG. 8 illustrates an embodiment of the axial-piston engine with the cylinder pistons and swash plate in the position corresponding to the minimum swept volume of cylinders according to the invention, longitudinal section.

As the liquid is delivered from the pressure source through the hydraulic line 113 into the space 112, the piston in the form of a flange 98b and the threaded bushing 99 move, thus causing the cylindrical body 95 to move. The pistons 12c will occupy a position corresponding to for example, a compression ratio $\epsilon = 10$ at a minimum value of the swept volume of the cylinders 114. The subsequent operation of the engine is similar to that described above.

Figure 9:
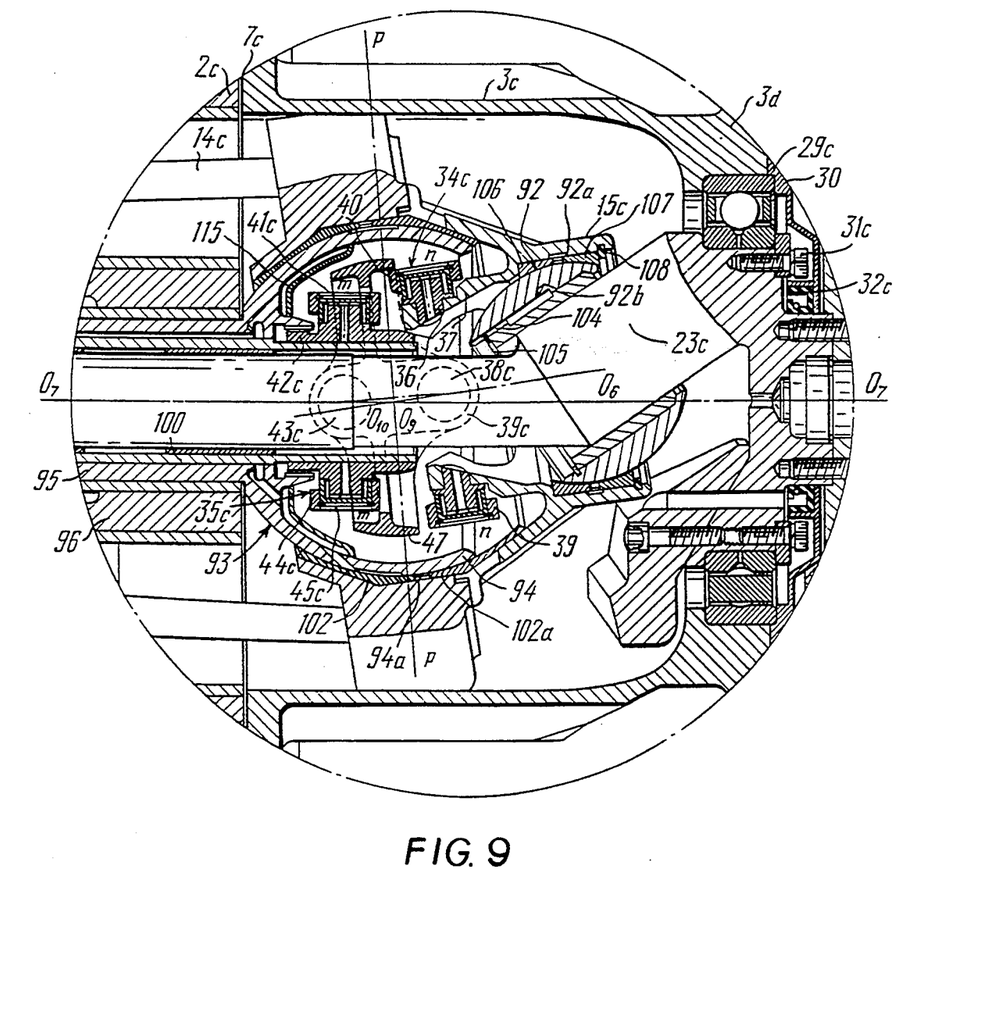
FIG. 9 illustrates the first and second supports of the swash plate and the universal joints turned through 90° in a plane perpendicular to the longitudinal axis of the shaft in the position corresponding to the minimum swept volume of engine cylinders according to the invention, in an enlarged, longitudinal section.

The proposed design of the second support 49 (FIG. 9) makes it possible to counterpose two ducts 115, the longitudinal section of each of said ducts lying in a plane turned through 90° relative to the plane of the drawing of the engine illustrated in FIG. 8. The ducts 115 are intended to deliver lubricant to the friction surfaces of the second support 49.

Figure 10:
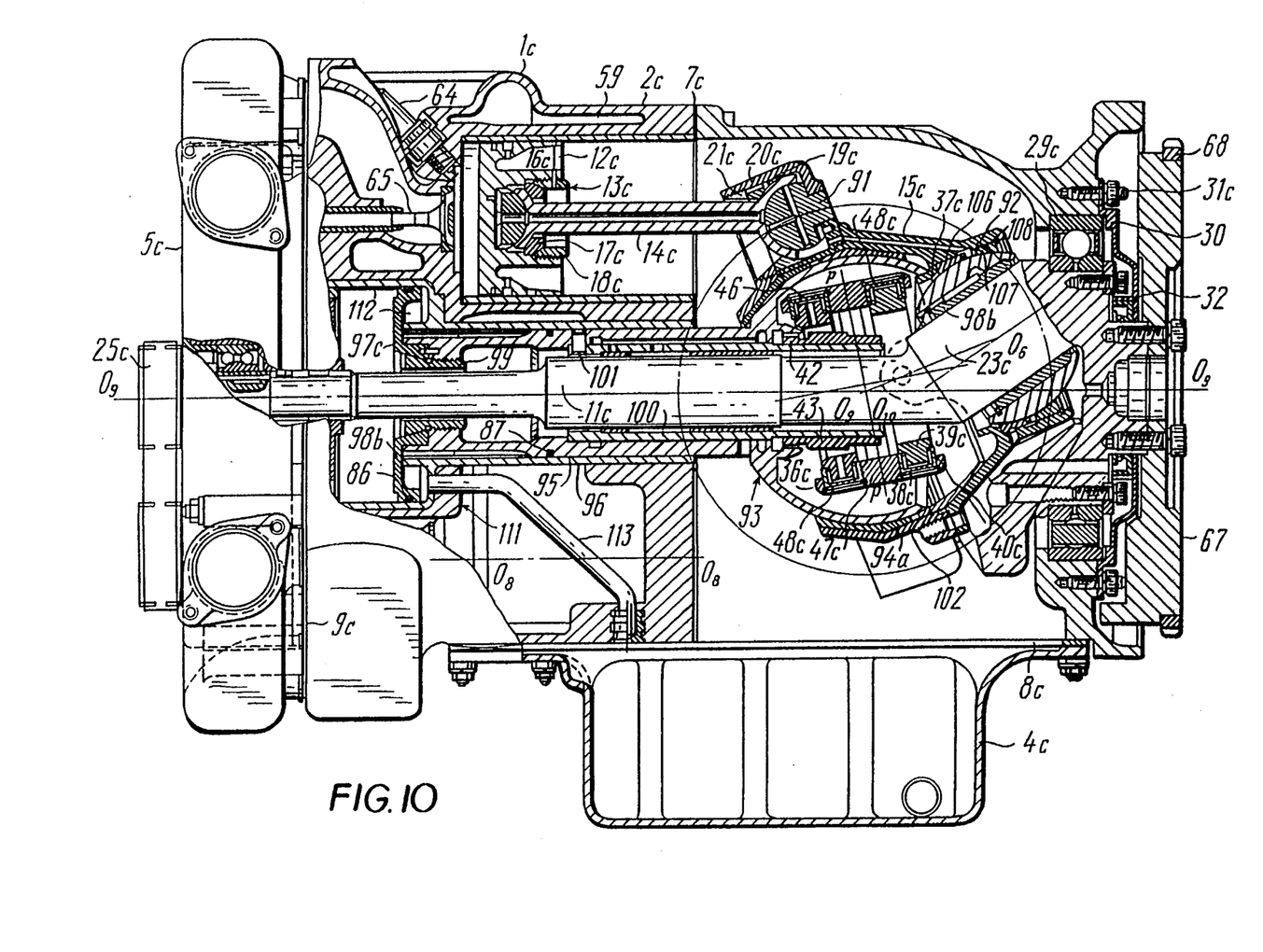
FIG. 10 is an embodiment of the axial piston engine with the cylinder pistons and swash plate in the position corresponding to the maximum swept volume of engine cylinders according to the invention, in longitudinal section.

As the liquid is discharged from the space 112 (FIG. 10), the force developed by the pressure of the gases applied to the faces of the pistons 12c puts the first and second supports 22, 49 in motion as described above. As a result, the supports 22 and 49 will come to a position corresponding to the maximum swept volume of the cylinders 114. Subsequently, the engine functions as described above.

The five-cylinder axial-piston engine realized according to the present invention, with a total cylinder volume of 2.7 l, developing a maximum torque of 220 Nm on the crankshaft with 4.0 ton load on each of the first and second supports, has been run for 300 h on a stand without breakdowns. A 30-35% fuel saving was attained under city traffic conditions.

We claim:
1. An axial-piston machine comprising:
a cylinder block;
a crankcase connected to said cylinder block and forming with the latter a body;
a first bearing in said cylinder block;
a second bearing in said crankcase;
a shaft having two ends, one of which is mounted on said first bearing and the other of which is mounted on said second bearing;
said shaft including an inclined journal;
said cylinder block having a plurality of cylindrical spaces, each of which has a geometric axis parallel to a longitudinal axis of said shaft;
a plurality of pistons equal in number and corresponding to said plurality of cylindrical spaces, each of said pistons being reciprocably slidable in a respective one of said plurality of cylindrical spaces;
a first support on said inclined journal;
a swash plate mounted on said inclined journal by said first support and means for kinematically connecting said swash plate to said plurality of pistons;
a kinematic linkage connecting said swash plate to said cylinder block;
said kinematic linkage including first and second universal joints,
said first universal joint being articulated to said swash plate and said second universal joint being articulated to said cylinder block;
a connecting member articulated to said first and said second universal joints; and
a second support for said swash plate connected to said cylinder block, said second support having a spherical surface with a center around which angular motion of said first and second universal joints takes place and through which passes a bisector plane serving as a plane of symmetry of said first and second universal joints and in which lies a geometric center of said connecting member.

2. An axial-piston machine as claimed in claim 1, wherein said second support is movable along the axis of said shaft, said first support has an external spherical surface and an internal cylindrical surface, said swash plate has a spherical surface concentric with said external spherical surface of said first support and interacting with said spherical external surface of said first support, said inclined journal has a cylindrical surface interacting with said internal cylindrical surface of said first support.

3. An axial-piston machine as claimed in claim 2, wherein said second support rotatably supports said first and second universal joints.

4. An axial-piston machine as claimed in claim 3, wherein said inclined journal of said shaft has an axis which forms an acute angle with a longitudinal axis of said swash plate, said angle varying between about 10° and about 30° upon changes in swept volume of said plurality of cylindrical spaces.

5. An axial-piston machine as claimed in claim 2, wherein said second support is located between a first axial plane of said first universal joint and a second axial plane of said second universal joint.

6. An axial-piston machine as claimed in claim 5, wherein said inclined journal of said shaft has an axis which forms an acute angle with a longitudinal axis of said swash plate, said angle varying between about 10° and about 30° upon changes in swept volume of said plurality of cylindrical spaces.

* * * * *

UNITED STATES PATENT AND TRADEMARK OFFICE
CERTIFICATE OF CORRECTION

PATENT NO. : 5,450,823
DATED : SEPTEMBER 19, 1995
INVENTOR(S) : Jury A. ROMANCHEV, et al.

It is certified that error appears in the above-indentified patent and that said Letters Patent is hereby corrected as shown below:

ON THE TITLE PAGE:

Item [75] Inventor. Add the following Inventors: Jury Alexandrovich Romanchev, Moscow, Russian Federation and Vadim Fedorovich Kutenev, Moscow, Russian Federation.

Signed and Sealed this

Twenty-third Day of April, 1996

Attest:

BRUCE LEHMAN

*Attesting Officer*  Commissioner of Patents and Trademarks